(12) United States Patent  (10) Patent No.: US 6,509,667 B1
El-Antably et al.  (45) Date of Patent: Jan. 21, 2003

(54) ROTOR FOR A RELUCTANCE MOTOR

(75) Inventors: Ahmed Mostafa El-Antably, Indianapolis, IN (US); Frank A. Wilder, Indianapolis, IN (US); David Allen Score, Shirley, IN (US)

(73) Assignee: Delphi Technologies, Inc., Troy, MI (US)

( * ) Notice: Subject to any disclaimer, the term of this patent is extended or adjusted under 35 U.S.C. 154(b) by 6 days.

(21) Appl. No.: 09/658,442

(22) Filed: Sep. 8, 2000

(51) Int. Cl.[7] .......................... H02K 15/00; H02K 1/22
(52) U.S. Cl. .......................... 310/261; 310/44; 310/43; 310/156.21; 310/217; 310/271
(58) Field of Search .................. 310/44, 166, 168, 310/261, 43, 216, 217, 271, 156.21

(56) References Cited

U.S. PATENT DOCUMENTS

| | | | | |
|---|---|---|---|---|
| 5,296,773 A | * | 3/1994 | El-Antably et al. | 310/261 |
| 5,693,250 A | * | 12/1997 | El-Antably et al. | 252/62.54 |
| 5,898,253 A | * | 4/1999 | El-Antably et al. | 310/261 |
| 6,064,134 A | * | 5/2000 | El-Antably et al. | 310/261 |
| 6,191,510 B1 | * | 2/2001 | Landin et al. | 310/51 |

* cited by examiner

Primary Examiner—Burton S. Mullins
(74) Attorney, Agent, or Firm—Margaret A. Dobrowitsky

(57) ABSTRACT

A reluctance rotor and method for manufacturing reluctance rotors having soft magnetic regions and regions with magnetic properties that are dissimilar to those of the soft magnetic region so as to create a flux barrier. The method generally entails producing a magnetic body having a central axis and an outer peripheral surface. The body is composed of concentric regions, at least one of which is a soft magnetic region while at least a second region of the concentric regions is formed of a material with dissimilar magnetic properties to the soft magnetic region. Once formed, the body is divided along radials thereof to form wedge-shaped members, with each wedge-shaped member having coaxial arcuate regions that are portions of the concentric regions of the body. As a result of the manner in which the body is divided, the wedge-shaped members have radial surfaces defined where the wedge-shaped members were divided from the body, and each wedge-shaped member also has a distal surface corresponding to the outer peripheral surface of the body. The wedge-shaped members are then arranged about an axis of symmetry corresponding to the axis of rotation of the rotor, with the distal surfaces of the wedge-shaped members disposed adjacent the axis of symmetry and facing each other, and with the radial surfaces of the wedge-shaped members facing away from the axis of symmetry. The wedge-shaped members are then bonded together and machined if necessary to form the rotor of the reluctance motor.

10 Claims, 3 Drawing Sheets

ROTOR FOR A RELUCTANCE MOTOR

TECHNICAL FIELD

The present invention generally relates to rotating electromagnetic components, such as rotors for motors and generators. More particularly, this invention relates to a method for mass-producing reluctance motor rotors having soft magnetic regions separated by hard (permanent) magnetic, soft magnetic or nonmagnetic (nonferromagnetic) regions that serve as flux barriers to the soft magnetic regions.

BACKGROUND OF THE INVENTION

Synchronous reluctance motors are a desirable alternative to electric motors and generators of the inductance type in terms of improved efficiency. While the stator of a reluctance motor is similar to that of an induction motor, its rotor is significantly more complex, requiring two axes of widely differing magnetic reluctance. For this purpose, reluctance rotors are often formed to have at or near its perimeter alternating regions of soft magnetic material and either nonmagnetic material or magnetized hard magnetic material. Various methods have been proposed for manufacturing reluctance rotors, with radial laminated cores formed of thin soft iron sheets being the typical approach. However, radial lamination methods have not proven desirable for high-volume manufacturing due to the labor intensity of the lamination process, as well as other process complexities and complications. Due to the complexity of reluctance rotors, conventional powder metallurgy methods have generally been found to be impractical for mass production. Furthermore, reluctance rotors formed by powder metallurgy with low core losses have typically lacked sufficient strength to operate at high rotational speeds.

In view of the above, it would be desirable if an improved manufacturing process were available that enabled the mass production of reluctance rotors.

SUMMARY OF THE INVENTION

The present invention is directed to reluctance rotors and a method for manufacturing reluctance rotors having soft magnetic regions separated by regions that serve as flux barriers to the soft magnetic regions. The method of this invention generally entails producing a generally cylindrically-shaped body having a central axis and an outer peripheral surface. The body is composed of concentric regions, at least one of which is a soft magnetic region while at least a second region of the concentric regions is formed of a material with dissimilar magnetic properties to the soft magnetic region, e.g., hard (permanent) magnetic, soft magnetic or nonmagnetic (nonferromagnetic) materials. Some or all of the concentric regions can be formed by powder metallurgy techniques. Once formed, the body is divided along radials thereof to form wedge-shaped members, with each wedge-shaped member having coaxial arcuate regions that are portions of the concentric regions of the body. As a result of the manner in which the body is divided, the wedge-shaped members have radial surfaces defined where the wedge-shaped members were divided from the body, and each wedge-shaped member also has a distal surface corresponding to the outer peripheral surface of the body. The wedge-shaped members are then arranged about an axis of symmetry corresponding to the axis of rotation of the rotor, with the distal surfaces of the wedge-shaped members disposed adjacent the axis of symmetry and facing each other, and with the radial surfaces of the wedge-shaped members facing away from the axis of symmetry. The wedge-shaped members are then bonded together and machined if necessary to form the rotor of the reluctance motor.

In view of the above, the process of this invention can be seen to produce a reluctance rotor without a complicated radial lamination process using sheets of different materials. Instead, the rotor of this invention is produced by reassembling wedge-shaped members cut from a preformed body that preferably contains all of the magnetic components of the rotor. Notably, the process of this invention entails fewer steps than required by prior art radial lamination methods, and greatly reduces the amount of scrappage and machining that is often required after the rotor has been assembled. The process of this invention also offers the benefits of lower production costs by eliminating stamping dies, and is capable of producing rotor assemblies with lower weight than prior art laminated assemblies. In applications where individual particles of the powder or powders are insulated with an encapsulation material, lower iron loses result, resulting in lower rotor temperatures, improved motor/generator efficiency and reduced cooling requirements. The result is a process that is practical for the mass production of reluctance rotors.

Other objects and advantages of this invention will be better appreciated from the following detailed description.

DESCRIPTION OF THE PREFERRED EMBODIMENT

Figure 1:
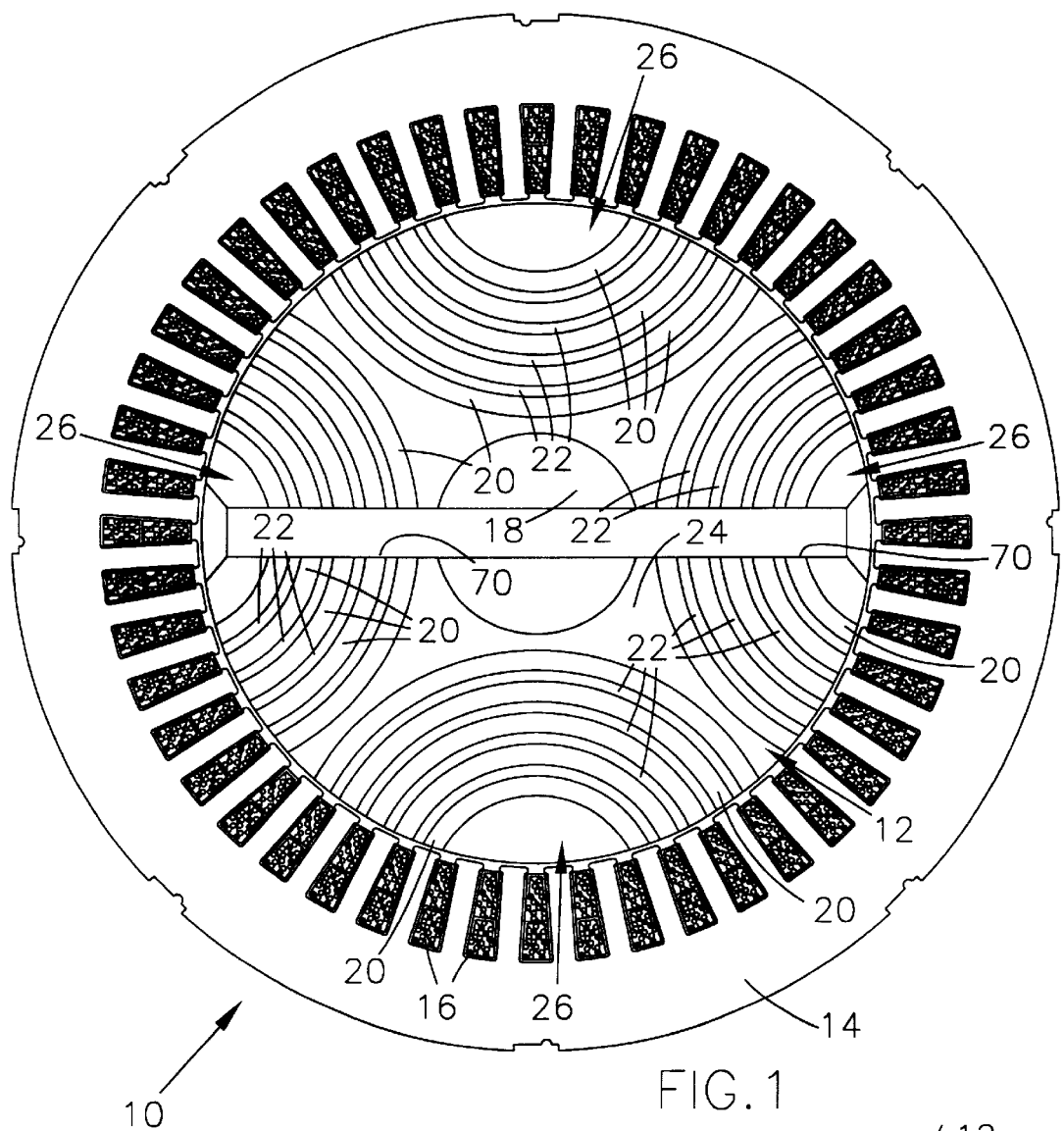
FIG. 1 is a cross-sectional end view of a reluctance motor with a rotor produced by the method of this invention.

FIG. 1 represents a reluctance motor 10 equipped with a rotor 12 manufactured in accordance with the present invention. The motor 10 includes a stator 14 that can generally be of a type conventional in the art. The stator 14 is shown to have slots containing copper conductors 16 that constitute the stator winding. The rotor 12 of this invention generally includes a central shaft 18 and multiple arcuate regions 20 and 22 that define the necessary alternating regions of differing magnetic properties around the circumference of the rotor 12. As will be described in detail below, the arcuate regions 20 and 22 are formed of, respectively, a ferromagnetic material and a second material whose magnetic properties differ from the ferromagnetic material. The ferromagnetic regions 20 are preferably formed of compacted soft magnetic powder. The regions 22 are formed of a nonferromagnetic material or a magnetic material that has been magnetized in a direction to create a flux barrier. If formed of a nonferromagnetic material, the regions 22 act as insulators between the magnetic flux paths of the rotor 12. If a magnetic material, preferably a permanent magnetic material, the regions 22 serve to efficiently direct the magnetic flux generated by the rotor 12. The general intent of forming the regions 22 of multiple layers is to create a barrier for the flux and impede any flux in the quadrature axis, minimizing the quadrature axis reactance of the rotor 12 and thereby significantly improving the performance of the synchronous reluctance machine. As will be discussed in greater detail below, various process and material alternatives are possible for the nonferromagnetic and magnetic materials used to form the regions 22.

Figure 6:
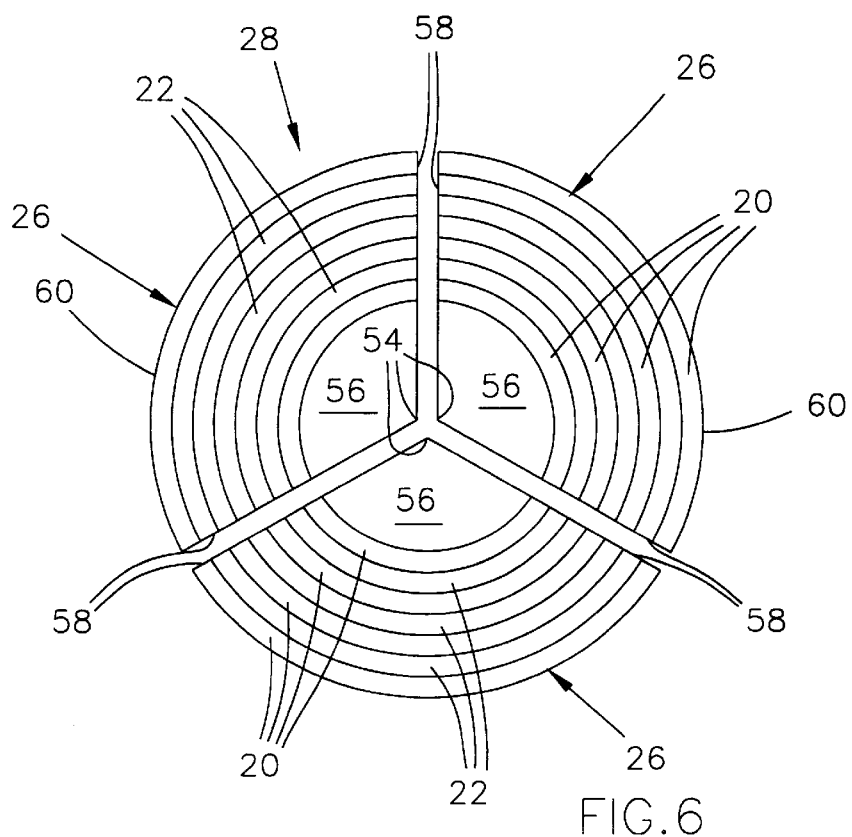
FIGS. 6 and 7 illustrate further steps performed to produce the rotor of FIG. 1 in accordance with this invention.
Figure 7:
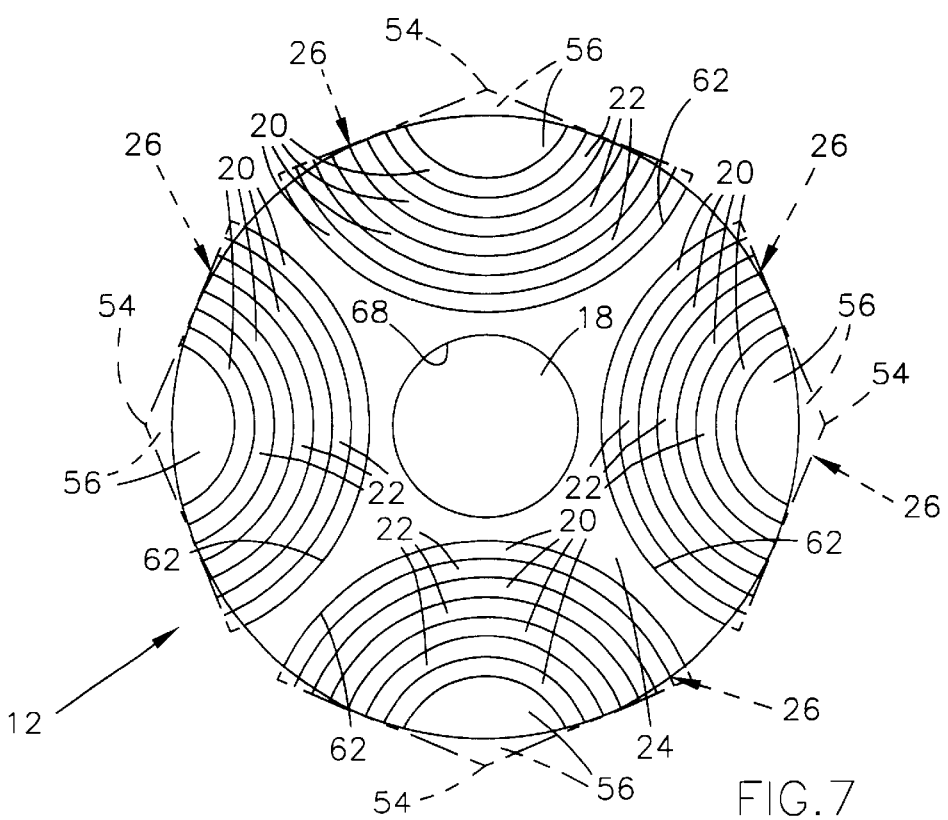

As shown in FIG. 6, the arcuate regions 20 and 22 are originally formed within sectors 26 divided from a cylindrically-shaped body 28. Three sectors 26 are shown as being divided from the body 28 in FIG. 6, while four sectors 26 are shown in FIG. 1 as being used to form the rotor 12, thereby indicating that more than one body 28 has been used to form the rotor 12. The sectors 26 are shown in FIG. 7 as having been assembled on a cradle 24 to yield the rotor 12 shown in FIG. 1.

Figure 3:
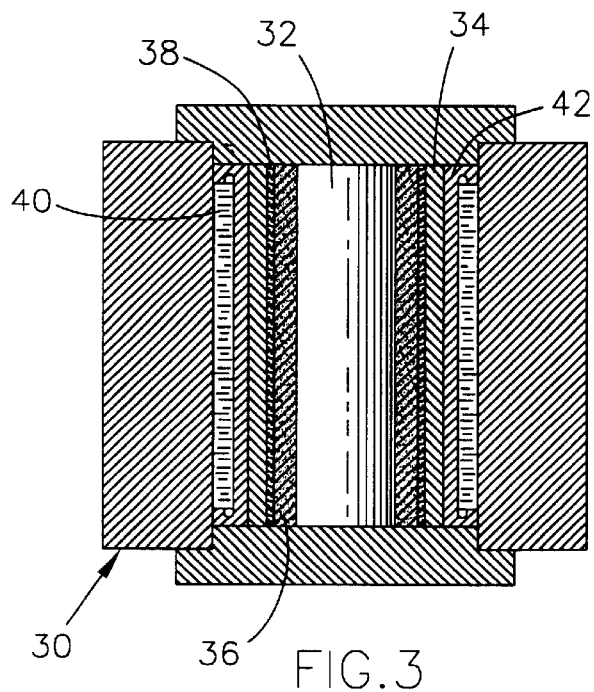
FIGS. 3 and 4 illustrate process steps for producing the rotor of FIG. 1 in accordance with one embodiment of this invention.
Figure 4:
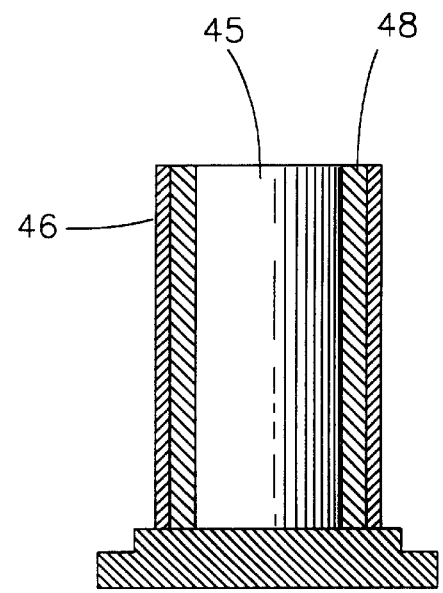

According to this invention, the body 28 is preferably formed at least in part by powder metallurgy. A first method for producing the cylindrical body 28 is represented in FIGS. 3 and 4, in which powder metallurgy is employed to form both regions 20 and 22 of the rotor 12. In FIG. 3, a powder 36 of a soft magnetic material is compacted using a pressure vessel 30, arbor 32 and tooling 34 to produce soft magnetic tubular-shaped bodies that are assembled to provide the soft magnetic regions 20 of the rotor 12. Suitable materials for the soft magnetic regions 20 include iron and its alloys, nickel and its alloys, cobalt and its alloys, iron-silicon alloys, iron-phosphorus alloys, iron-silicon-aluminum alloys, ferrites and magnetic stainless steel alloys. A suitable average particle size range for the powder 36 is generally about 5 to about 1000 micrometers, with a preferred average size being about 100 to 200 micrometers. To facilitate processing and maximize density after compaction, the individual particles of the powder 36 are preferably encapsulated with a polymeric coating material. In a preferred embodiment of the invention, the encapsulation material is a permanent constituent of the rotor 12, serving to adhesively bond the powder particles together and provide an insulating layer to contain the eddy currents within individual particles. Suitable materials for this purpose include poly(alkylene carbonates), polyphenylene oxide (PPO) polymer systems such as NORYL® from General Electric, nylons, polyetherimides such as ULTEM® from General Electric, fluorocarbon polymers such as TEFLON®, acrylics, epoxies, phenolics, polyesters and silicones. Other possible insulating materials include ceramics and metal oxides, such as iron oxide. The encapsulating material is preferably deposited on the powder particles to form a substantially uniform coating layer, which may constitute about 0.05 to about 1 weight percent of each particle, preferably about 0.10 to about 0.50 weight percent of each particle. To further promote densities and eliminate the requirement for external die wall spray lubricants, the powder can be admixed with lubricants such as stearates, fluorocarbons, waxes, low-melting polymers and synthetic waxes such as ACRAWAX available from Lonza, Inc. Suitable methods for encapsulating the powders are well known, and include solution blending, wet blending and mechanical mixing techniques, and Wurster-type batch coating processes such as those described in U.S. Pat. Nos. 2,648,609 and 3,253,944.

The arbor 32 and pliable tooling 34 are shown in FIG. 3 as defining an annular-shaped cavity in which the powder 36 has been dispensed. Also shown within the cavity is a mesh 38 that will serve as reinforcement for the rotor 12, promoting the rotational speeds that are possible with the rotor 12. Optionally or alternatively, a nonconductive fiber reinforcement material can be dispersed in the powder 36. Suitable materials for the mesh 38 and/or nonconductive fiber reinforcement include fiberglass and aramid fibers. With the fixture 30 of FIG. 3, compaction of the powder 36 is achieved with a pressure transmitting fluid 40 contained within a diaphragm 42, which applies a uniform pressure over the entire outer surface of the tooling 34. Using the apparatus shown in FIG. 3, compaction loads of about 50 to 100 ksi (about 386 to about 772 MPa) are generally suitable for compacting the soft magnetic powder 36 to form a high-density tubular-shaped body. Depending on the powder and encapsulation materials, compaction can be promoted by heating the powder 36 and/or tooling as generally known in the art.

FIG. 4 represents another step in this process, in which a steel arbor 45 has been placed within a pliable tooling 46 to form a second annular-shaped cavity. The arbor 45 has an outside diameter sized to produce the inside diameter of a tubular-shaped body that will serve as one of the magnetic regions 22 of the rotor 12. A powder 48 is shown as having been dispensed and compacted within the cavity to produce the tubular-shaped body. This mold assembly can be compacted in the same manner as described in reference to FIG. 3. Additional regions 20 and 22 required for the rotor 12 of FIG. 1 can be formed in the same manner, with incrementally larger arbors and pliable tooling, to produce tubular-shaped bodies that when assembled together yield the cylindrical body 28 shown in FIG. 6.

The desired material for the powder 48 used in FIG. 4 will depend on the particular application for the rotor 12. According to this invention, the powder 48 can be a nonferromagnetic material, or a permanent (hard) magnet material, or a "soft" magnetic material. Suitable soft magnetic materials include those noted above as being suitable for the soft magnetic regions 20. Suitable nonferromagnetic materials include thermoplastics, thermoset plastics and other suitable materials, and serve as insulators between the magnetic flux paths of the rotor 12. Suitable permanent magnetic materials include Alnicos (alloys of aluminum, nickel, cobalt and iron), ferrites, iron-rare earth metal alloys, samarium alloys and ceramic materials. Certain electromagnetic applications require or benefit from a combination of soft iron magnets and hard magnets, such as when hard magnets are used to block or direct the magnetic flux of a rotor in order to render the rotor more efficient with higher outputs. A prominent example of a permanent magnetic material for such applications is based on compositions containing iron, a rare earth metal such as neodymium and/or praseodymium, and boron. Such permanent magnets contain, as an essential magnetic phase, grains of tetragonal crystals in which the proportions of iron, neodymium and boron (for example) are exemplified by the empirical formula $Fe_{14}Nd_2B$. These magnetic compositions and methods for making them are described in U.S. Pat. No. 4,802,931 to Croat, U.S. Pat. No. 4,782,367 to Lee, and U.S. Pat. No. 4,842,656 to Maines et al. Preferred permanent magnetic materials are neodymium-iron-boron compositions available from Magnequench International. As known in the art, these materials are characterized by an amorphous noncrystalline metallurgical structure and can be processed to exhibit magnetic anisotropy.

An alternative method to the mechanical/hydraulic compaction method represented by FIGS. 3 and 4 is to use an electromagnetic compaction technique, such as dynamic magnetic compaction (DMC), which uses high electromagnetic forces capable of achieving densities of about 99.5% of theoretical. DMC methods involve a fixture similar to that of FIG. 4, but with the outer tooling being formed of copper, aluminum or other suitable conductive material. The fixture containing the powder to be compacted is placed within a flux shaper of known type. High electrical energy is then applied to primary windings surrounding the flux shaper, setting up high current in the flux shaper that induces eddy currents in the tooling. This in turn creates an opposing magnetic field and applies a force field that compacts the powder. As with the mechanical/hydraulic compaction method of FIGS. 3 and 4, electromagnetic compaction can be used to produce soft and hard magnetic bodies that are assembled to yield the cylindrical body 28 having any desired number of regions 20 and 22.

Figure 5:
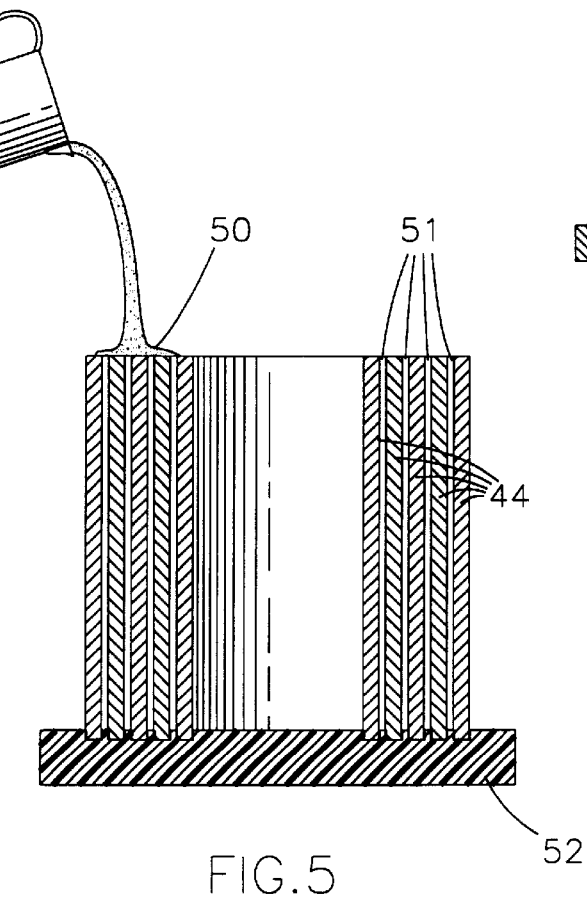
FIG. 5 illustrates a process step for producing the rotor of FIG. 1 in accordance with an alternative embodiment of this invention.

Another method for forming the cylindrical body 28 is represented in FIG. 5, which shows four soft magnetic tubular-shaped bodies 44 of different diameters. The bodies 44 are formed of a compacted soft magnetic powder by any of the mechanical and electromagnetic compaction methods described above, and define the soft magnetic regions 20 of the rotor 12 in FIG. 1. As seen in FIG. 5, the bodies 44 are mounted in a concentric arrangement on a base 52, such that annular gaps 51 exist between adjacent bodies 44. The gaps 51 are then filled by gravity, vacuum-assisted or pressure with an electrical-insulating, nonferromagnetic material 50 to form the regions 22 of the rotor 12. Reinforcing material such as a fiberglass mat or cloth may be prepositioned in the gaps 51 prior to filling, or reinforcing fibers may be mixed with the material 50 prior to filling. Preferred insulating materials 50 have a similar coefficient of thermal expansion to the bodies 44 in order to minimize thermal cycling effects. Suitable materials for this purpose including thermoplastic and thermoset polymers such as epoxies, which may be filled or unfilled with particulate or fibrous fillers to adjust the coefficient of thermal expansion. Once dispensed in the gaps 51, the material 50 will typically undergo a curing cycle, yielding a solid composite body with both soft magnetic and nonferromagnetic regions corresponding to the regions 20 and 22 of the rotor 12.

Figure 2:
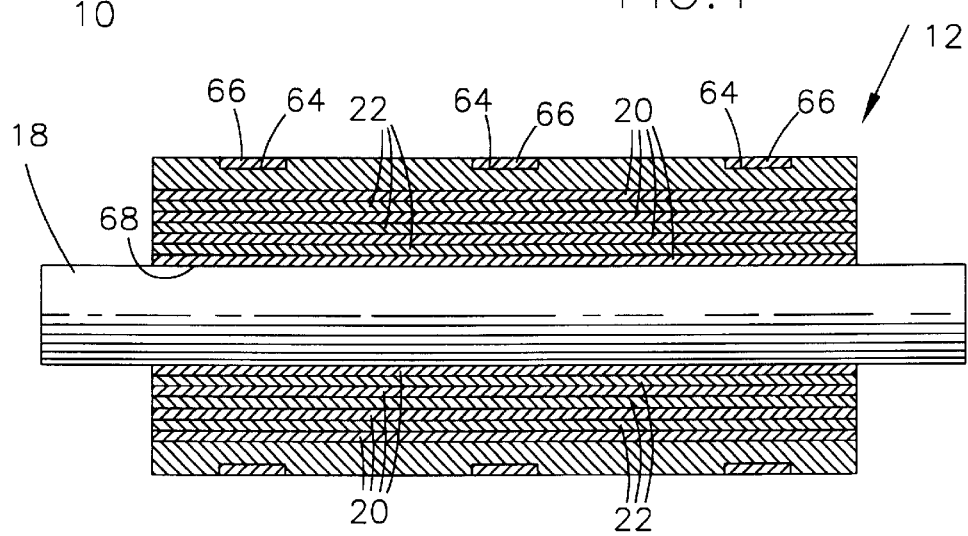
FIG. 2 is a cross-sectional side view of the rotor of FIG. 1.

As other alternatives to the above methods, preforms of a hard magnetic material can be produced in any suitable manner and then coated with a nonmagnetic material, or a powder of a hard magnetic material can be premixed with a plastic, polymeric or other suitable material and molded to form a suitable preform. These preforms can then be assembled with one or more soft magnetic tubular-shaped bodies produced by the methods described above (e.g., FIGS. 3) to yield the cylindrical body 28 of FIG. 6. The preforms can be magnetized before assembly with the bodies, or after assembly of the rotor 12 is complete (FIG. 2).

Cylindrical bodies 28 formed by any one of the methods described above are then further processed in accordance with FIGS. 6 and 7. FIG. 6 is an end view of a cylindrical body 28 that has been divided into sectors 26 at three equinagular-spaced radials of the body 28. If used to form the regions 22, a hard magnetic material can be magnetized anytime prior to sectioning, or after assembly of the rotor 12 is completed. While not required by this invention, the body 28 depicted in FIG. 6 is shown as having a filled interior region 56. The interior region 56 can be formed by inserting a cylindrical bar or rod in the central bore created by the arbor 32 of FIGS. 3 and 4, or by filling the interior of the smallest body 44 in FIG. 5. Suitable fill materials include filled and unfilled thermoplastic and thermoset polymers. By sectioning the body 28 in the manner shown in FIG. 6, each sector 26 is generally wedge-shaped with an apex 54 defined by the filled interior region 56, radial surfaces 58 defined where the sectors 26 were divided from the body 28 along the radials, and an outer arcuate (convex) surface 60 corresponding to the outer cylindrical surface of the body 28.

In FIG. 7, four sectors 26 formed from cylindrical bodies 28 in the manner shown in FIG. 6 are shown as having been assembled in the cradle 24, each within an arcuate trough or recess 62 formed in the cradle 24. The recesses 62 are preferably parallel to the axis of the cradle 24 (corresponding to the axis of the rotor 12) and extend the full length of the cradle 24 (corresponding to the length of the rotor 12). The cradle 24 can be formed of fiber-reinforced plastic or a nonmagnetic stainless steel, though the use of other materials is foreseeable. An adhesive such as an epoxy is preferably used to bond the outer arcuate surfaces 60 of the sectors 26 to the surfaces of the recess 62. Portions of the apex 54, filled interior regions 56, and regions 20 and 22 are indicated by phantom lines as having been machined from the rotor 12 to produce the desired cylindrical shape for the rotor 12, portrayed in FIGS. 1, 2 and 7. Also shown in FIG. 2 are circumferential grooves 64 formed in the exterior of the rotor 12, with bands 66 received in the grooves 64 to further bind the sectors 26 together for high speed operation. Lastly, the shaft 18 is shown in FIGS. 2 and 7 as being positioned and secured within a central bore 68 within the cradle 24. As an alternative to the grooves 64 and bands 66, bores 70 (FIG. 1) can be machined in the sectors 26 to allow the use of fasteners to secure the sectors 26 to the shaft 18.

While the invention has been described in terms of a preferred embodiment, it is apparent that other forms could be adopted by one skilled in the art. For example, various methods, materials and components could be used to secure the sectors 26 to the cradle 24. In addition, different materials could be employed than those noted, and various heat treatments could be employed to alter the properties of the materials and the rotor 12 as a whole. Accordingly, the scope of the invention is to be limited only by the following claims.

What is claimed is:

1. A rotor of a reluctance motor, the rotor having an axis of rotation and comprising:

a cradle having recesses and an axis corresponding to the axis of rotation of the rotor, wedge-shaped members received in the recesses of the cradle so as to be arranged about the axis of rotation of the rotor, each of the wedge-shaped members being a section of a solid composite body and comprising an arcuate surface defined by coaxial arcuate regions of at least one of a soft magnetic region and at least one of a second region of a material with dissimilar magnetic properties to the soft magnetic region so that the second region serves as a flux barrier to the soft magnetic region, the soft magnetic region of each of the wedge-shaped members being formed of a compacted soft magnetic powder material, the wedge-shaped members being arranged in their respective recesses so that their arcuate surfaces are adjacent the axis of the cradle and face each other; and a binder bonding the arcuate surfaces of the wedge-shaped members to the cradle to form the rotor of the reluctance motor.

2. The rotor according to claim 1, wherein the material of the second region of each wedge-shaped member is chosen from the group consisting of nonferromagnetic, hard magnetic and soft magnetic materials.

3. The rotor according to claim 1, wherein within each of the wedge-shaped members, at least one of the soft magnetic region and the second region contains a dispersion of particulate reinforcement material.

4. The rotor according to claim 1, further comprising circumferential grooves and bands contained within the circumferential grooves and securing the wedge-shaped members together.

5. The rotor according to claim 1, wherein particles of the soft magnetic powder material are encapsulated with a polymeric material.

6. The rotor according to claim 1, wherein the second region is formed of a compacted powder of the material having dissimilar magnetic properties to the soft magnetic region.

7. The rotor according to claim 6, wherein particles of the material having dissimilar magnetic properties to the soft magnetic region are encapsulated with a polymeric material.

8. The rotor according to claim 1, wherein the second region of each of the wedge-shaped members is formed of a polymeric material cured to form the solid composite body of the wedge-shaped member.

9. A rotor of a reluctance motor, the rotor having an axis of rotation and comprising:

a cradle having recesses and an axis corresponding to the axis of rotation of the rotor;

wedge-shaped members received in the recesses of the cradle so as to be arranged about the axis of rotation of the rotor, each of the wedge-shaped members comprising a surface defined by coaxial arcuate regions of at least one of a soft magnetic region and at least one of a second region of a material with dissimilar magnetic properties to the soft magnetic region so that the second region serves as a flux barrier to the soft magnetic region, the soft magnetic region of each of the wedge-shaped members being formed of a compacted soft magnetic powder material, the wedge-shaped members being arranged in their respective recesses so that their surfaces are adjacent the axis of the cradle and face each other;

a reinforcement mesh material disposed between at least two of the coaxial arcuate regions of each of the wedge-shaped members; and a binder bonding the surfaces of the wedge-shaped members to the cradle to form the rotor of the reluctance motor.

10. A reluctance motor having a rotor comprising:

a cradle having an axis of symmetry and longitudinal recesses parallel to the axis of symmetry, the axis of symmetry corresponding to an axis of rotation of the rotor;

sectors received in the recesses of the cradle, each of the sectors comprising coaxial arcuate regions of at least one of a soft magnetic region and at least one of a second region of a material with dissimilar magnetic properties to the soft magnetic region so that the second region serves as a flux barrier to the soft magnetic region, the soft magnetic region of each of the sectors being formed of a compacted encapsulated soft magnetic powder material;

a reinforcement mesh material disposed between at least two of the coaxial arcuate regions of each of the sectors; and a binder bonding the sectors to the cradle to form the rotor of the reluctance motor.

* * * * *